United States Patent [19]

Pessel

[11] 4,070,441
[45] Jan. 24, 1978

[54] METHOD OF REMOVING SULFUR DIOXIDE FROM FLUE GASES

[75] Inventor: Leopold Pessel, Wyndmoor, Pa.

[73] Assignee: American Electronic Laboratories, Inc., Colmar, Pa.

[21] Appl. No.: 545,928

[22] Filed: Jan. 31, 1975

[51] Int. Cl.$^2$ .................. C01B 17/00; C01B 17/72
[52] U.S. Cl. ........................... 423/242; 423/522; 423/558; 71/30
[58] Field of Search .................. 423/242–244, 423/522, 235, 558; 71/29

[56] References Cited

U.S. PATENT DOCUMENTS

| 3,565,575 | 2/1971 | Warshaw | 423/235 |
| 3,836,630 | 9/1974 | Noguchi et al. | 423/242 |
| 3,848,058 | 11/1974 | Poncet et al. | 423/242 |

Primary Examiner—O. R. Vertiz
Assistant Examiner—Gregory A. Heller
Attorney, Agent, or Firm—Jacob Trachtman

[57] ABSTRACT

The sulfur dioxide containing flue gases are passed through a gas scrubber containing an aqueous solution of a metal salt which can be reduced by sulfur dioxide from a high valence state to a lower valence state. This oxidizes the sulfur dioxide to either sulfur trioxide or sulfuric acid which dissolves in the solution. The sulfur compound containing solution is removed from the first gas scrubber and placed in a regeneration gas scrubber through which air is passed. The oxygen in the air oxidizes the reduced metal salt and thereby regenerates the solution to its original composition. The regenerated solution is then recycled to the first gas scrubber where further removal of sulfur dioxide from the flue gas occurs.

1 Claim, 1 Drawing Figure

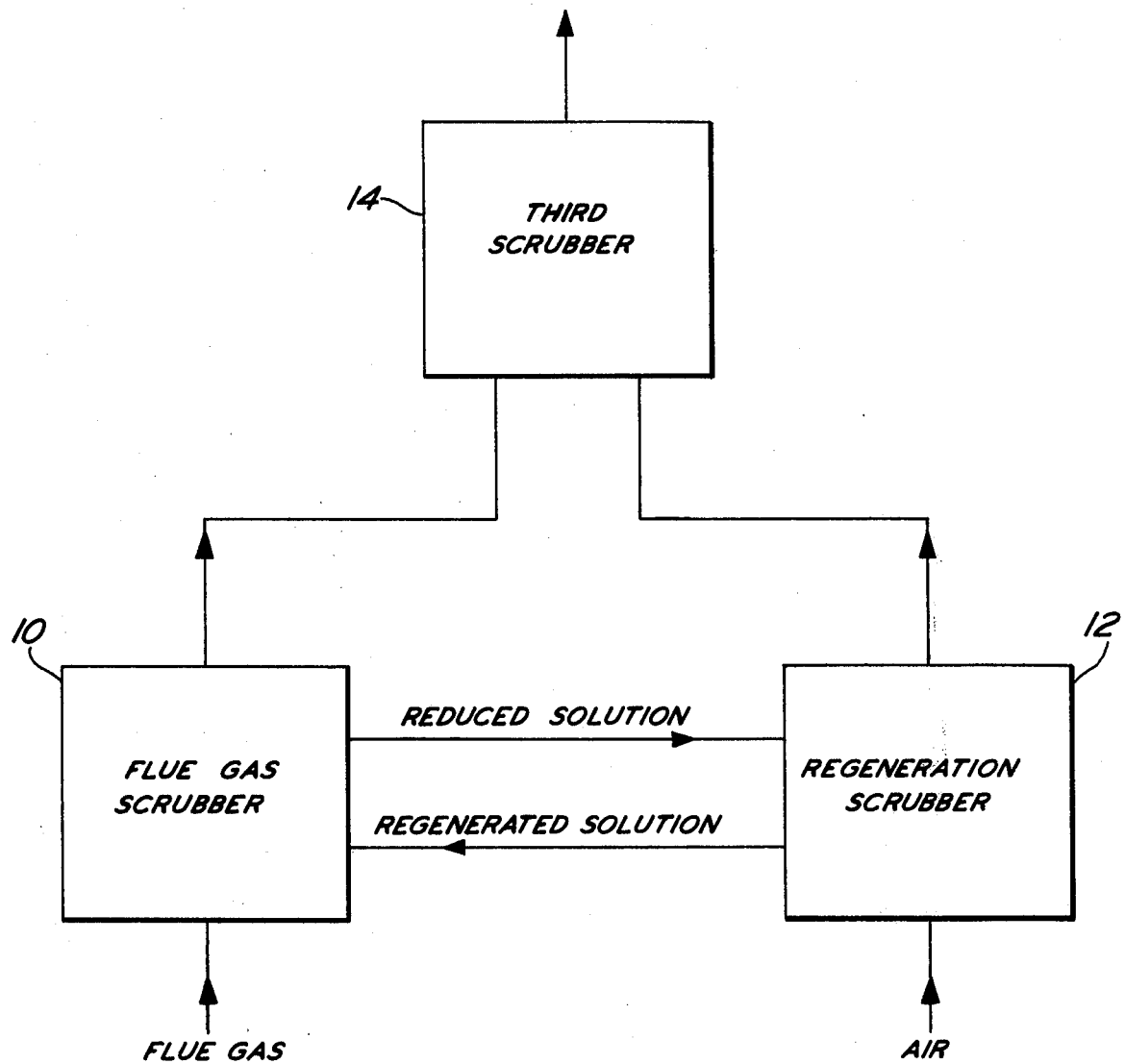

METHOD OF REMOVING SULFUR DIOXIDE FROM FLUE GASES

The present invention relates to a method of removing sulfur dioxide from flue gases, and particularly to a method which is economical in that the ingredients are regenerated and recycled for long usage life, and when exhausted are in a form which has other commercial usage.

One of the major sources of available energy in the United States and a number of other countries is coal. However, in many areas the use of coal has been limited because of the high sulfur content of the coal in these areas. When such coal is burned, the combustion gases contain a high content of sulfur dioxide which is an undesirable air pollutant. This same problem applies to the use of high sulfur containing fuel oil. In order to permit the use of these readily available sources of energy while meeting air quality standards, various techniques have been tried to remove the sulfur dioxide from the flue gases and prevent undesirable pollution of the air.

One technique which has been used is to vent the flue gases into the atmosphere through a very tall stack. This does not reduce the emission of undesirable pollutants into the atmosphere, but merely emits the pollutants at a point high enough so as to not pollute the air adjacent the ground. However, under certain atmospheric conditions the flue gases are forced downwardly to the ground requiring the discontinuance of the burning of the high sulfur containing fuels. Thus, this technique is not satisfactory.

Another technique which is used is to treat the flue gases with lime or wet limestone. In these techniques either dry lime or limestone is injected into the boiler and the partly reacted material is removed in a wet scrubber, or slurries of lime or limestone are reacted with the sulfur dioxide in the flue gases in scrubbing towers to form calcium sulfates and sulfides which are collected and impounded. However, these techniques require the use of large quantities of the lime or limestone and the equipment to handle the initial ingredients as well as the reacted material. Thus, these techniques have not been found to be economically satisfactory.

As described in the article "High-Sulfur Coal for Generating Electricity" by James T. Dunham et al, SCIENCE, Vol. 184, Apr. 19, 1974, pages 346 to 351, various other techniques have been tried for removing the sulfur dioxide from flue gases. However, these techniques have not been found to be entirely satisfactory either because they are not sufficiently efficient or are uneconomical.

Therefore, it is an object of the present invention to provide a novel method of removing sulfur dioxide from flue gases.

It is another object of the present invention to provide a method for removing sulfur dioxide from flue gases in which the materials used can be regenerated and recycled for economic operation.

It is still another object of the present invention to provide a method for removing sulfur dioxide from flue gases in which the materials used can be regenerated and recycled, but when completely exhausted are in a form which has commercial utility.

Other objects will appear hereinafter.

These objects are achieved by a method wherein the sulfur dioxide containing flue gases are scrubbed with an aqueous solution of a metal salt which can be reduced from a high valence state to a lower valence state and thereby oxidize the sulfur dioxide to a compound which dissolves in the solution. The solution is then scrubbed with oxygen to reoxidize the reduced metal salt and thereby regenerate the solution for use in removing additional sulfur dioxide from the flue gas.

For the purpose of illustrating the invention there is shown in the drawing a form which is presently preferred; it being understood, however, that this invention is not limited to the precise arrangements and instrumentalities shown.

The FIGURE of the drawing is a flow chart of the method of the present invention.

As shown in the drawing, the sulfur dioxide containing flue gas is passed into a flue gas scrubber 10 which contains an aqueous solution of a metal salt which is capable of being reduced from a high valence state to a lower valence state. The salt can be any commercially available salt of such metals as iron, manganese, vanadium, etc. The salts of iron are preferred for economic reasons. Hereinafter, the method of the present invention will be described with the use of an iron salt, ferric sulfate, although it should be understood that other metal salts can be similarly used. The metal salt solution is preferably slightly acidic with the addition of sulfuric acid. Thus, a preferred solution is as follows:

$$(H_2O)_x + H_2SO_4 + Fe_2(SO_4)_3$$

As the flue gases pass through the flue gas scrubber 10, the sulfur dioxide in the flue gas is absorbed in the above solution and reacts with the water in the solution to form sulfurous acid as follows:

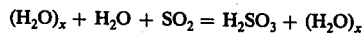

$$(H_2O)_x + H_2O + SO_2 = H_2SO_3 + (H_2O)_x$$

The sulfurous acid reacts with the metal salt to reduce the metal salt from a high valence state to a lower valence state and oxidizes the sulfur compound as follows:

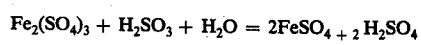

$$Fe_2(SO_4)_3 + H_2SO_3 + H_2O = 2FeSO_4 + 2H_2SO_4$$

When the original solution has been subjected to the flue gas for a time such that a predetermined amount of the metal salt has been reduced to the lower valence state, but before all of it is so reduced, the solution is removed from the flue gas scrubber 10 and passed into a regeneration scrubber 12. The appropriate time for transferring the solution from the flue gas scrubber 10 to the regeneration scrubber 12 will depend upon operating conditions as explained in more detail below and may be, for example, when 80 weight % of the initial ferric salt has been reduced to ferrous salt. Air is passed through the regeneration scrubber 12. The oxygen in the air is absorbed in the solution and reacts with the reduced iron salt to oxidize the iron salt. If the reduced iron salt is ferrous sulfate, the salt is oxidized to basic ferric sulfate as follows:

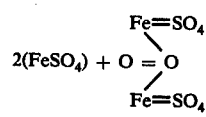

This reacts with the sulfuric acid in the solution to form the original metal salt and water as follows:

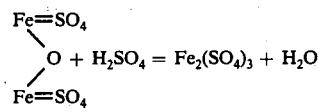

$$Fe_2(SO_4)_3 + H_2SO_4 \text{... } = Fe_2(SO_4)_3 + H_2O$$

Thus, the solution is regenerated back to its original state and is then returned to the flue gas scrubber 10 to react with additional sulfur dioxide in the flue gas. The solution in the regeneration scrubber 12 is regenerated and can be returned to the flue gas scrubber 10, for example, when 80 weight % of the ferrous salt has been oxidized to ferric salt or other suitable weight percentage. The solution can be recycled between the flue gas scrubber 10 where sulfur dioxide is removed from the flue gas by the solution, and the regeneration scrubber 12 where the solution is regenerated until the concentration of sulfuric acid in the solution becomes sufficiently high, as for example, above 50 weight percentage. The solution can then be used commercially for its sulfuric acid content.

It is to be understood that the invention is based upon a qualitative utilization of the described chemical reactions. The actual percentage of the reagents is not involved in the inventive concept but may undergo wide variations due to operating conditions, and requirements, cost factors, etc.

The fluid in the flue gas scrubber may contain a ferric salt, either in extreme dilution of the order of one percent by weight or even less, or in increasing concentrations up to the saturation limit of the ferric salt which may be about 30 percent by weight, depending on temperature and acid content, or even higher. The fluid may also contain an indetermined amount of ferrous salt and may, or may not, contain initially a mineral acid, such as sulfuric acid. None of these are required as part of the invention, although a certain amount of acid may be desirable to minimize hydrolysis of the ferric salt and precipitation of ferric hydroxide.

Also, this fluid may have been obtained initially by leaching or chemically treating iron containing ores or other materials with acid, and thus may contain varying amounts of acid, ferric salt, ferrous salt, and other adventitious compounds. From the initial concentration, the acid content increases, of course, progressively during the disclosed process. However, regardless of the actual variable percent content of these compounds, the fluid will still fulfill its function as an oxydant for sulfur dioxide as long as some ferric salt is present.

The composition stage at which the fluid is transferred from the flue gas scrubber to the air scrubber regenerator is variable and subject to a number of practical considerations. Theoretically, it would be possible to wait until all of the ferric salt has been reduced to ferrous salt before making the transfer. However, this would obviously entail some loss in the $SO_2$ capturing efficacy of the system. Also, by operating the fluid to a very low level of ferric concentration, a similar borderline of efficacy can be reached due to variations in the mechanical design and operation of the scrubber and variations in the $SO_2$ content of the flue gas. Consequently, the lower limit of ferric salt when a transfer should be made is contemplated to be about 5–10 percent of the initial content, although a lower limit is not ruled out. Generally it is visualized that the transfer will be made when the ferric salt content has dropped to 20–50 percent of the initial content, but higher or lower percentages may be adopted for a variety of reasons and the invention should not be limited in that respect.

The composition stage at which the fluid is transferred back from the air scrubber regenerator to the flue gas scrubber may also vary within wide limits. Ideally, this transfer should take place when all of the ferrous salt has been reoxidized to the ferric state. However, as the concentration of ferrous becomes very low, the rate of conversion may also decrease, depending on design and performance of the air scrubber, the acid concentration, temperature, etc. Also, a balance must be drawn between the operating expense of the regenerator, the benefits accruing from a higher percentage of ferric, the expenses (power, etc.) of the transfer, the demand of the gas scrubber (or scrubbers) for regenerated fluid, its required ferric content, etc. Consequently, for each installation, there will be a certain ferric concentration attained in the regenerator when the transfer will be made, regardless of the amount of residual ferrous salt. This ferric percentage is contemplated to be between 50 and 80 percent of the maximum attainable but it might be higher or lower for a variety of reasons.

In order to provide for continuous removal of sulfur dioxide from the flue gas in the flue gas scrubber 10, it is desirable to have a fresh or regenerated solution ready to be fed into the flue gas scrubber 10 as a reacted solution is transferred from the flue gas scrubber 10 to a regeneration scrubber 12. Therefore, it is preferable to provide the system with two or more regeneration scrubbers 12 so that there is always sufficient regenerated solution available to maintain the continuous operation of the flue gas scrubber 10.

The flue gases which leave the flue gas scrubber 10 after the sulfur dioxide is removed, and the air leaving the regeneration scrubber 12 may be fed into a third scrubber 14 which contains an aqueous solution of a nitrogen compound of a basic nature, such as urea $CO(NH_2)_2$ or guanidine $NHC(NH_2)_2$. The purpose of the third scrubber 14 is to trap and absorb any acid mist that may be carried by the gas streams from the flue gas scrubber 10 and the regeneration scrubber 12. The reaction of the acid mist with the solution in the third scrubber 14 may form such additional products as $CO(NH_2) - H_2SO_4$, $CO(NH_2)_2 - HNO_3$, etc., which can be ultimately utilized commercially for agricultural fertilizing purposes because of their high nitrogen content. Also, depending on the composition of the flue gas, which may vary widely, such additional scrubbing may also trap and possibly decompose some nitrogen containing combustion gas products, such as in the reaction of urea with nitrous acid:

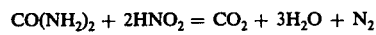

$$CO(NH_2)_2 + 2HNO_2 = CO_2 + 3H_2O + N_2$$

Thus, the third scrubbing can provide additional ecological benefits as well as providing additional commercially usable products.

Thus, there is provided by the present invention a method of removing sulfur dioxide from flue gases in which the materials used are regenerated so as to minimize the amount of material required and thereby minimize the over all cost of the operation. Also, the method can be carried out using standard, commercially available equipment. In addition, the method results in the formation as by-products of materials, such as the sulfuric acid and the high nitrogen content fertilizer materials, which can be sold commercially to further reduce the over all cost of the method.

The present invention may be embodied in other specific forms without departing from the spirit or essential attributes thereof and, accordingly, reference should be made to the appended claims, rather than to the foregoing specification as indicating the scope of the invention.

What is claimed is:

1. A method of removing sulfur dioxide from flue gas by scrubbing with a ferric sulfate containing liquid, which is regenerative and continuous, and leading to a progressive increase in the sulfuric acid content of the liquid comprising the steps of:
   a. subjecting the sulfur dioxide containing gas in a flue gas scrubber to an aqueous mixture containing ferric sulfate in which the ferric sulfate reacts stoichiometrically with the sulfur dioxide, being reduced to ferrous sulfate while the sulfur dioxide is oxidized to sulfur trioxide which dissolves in the mixture as sulfuric acid, said ferric sulfate being present in the beginning of step a) in an amount in the order of one percent by weight and up to the saturation limit of the sulfate in the mixture,
   b. subjecting the mixture in a plurality of regenerating scrubbers to the action of an oxygen-containing gas essentially free of sulfur dioxide to reoxidize and regenerate at least a portion of the ferrous sulfate formed in step a) to provide ferric sulfate in an amount specified for the beginning of step a), the plurality of regenerating scrubbers being provided for the flue gas scrubber of step a) to make available to it sufficient regenerated ferric sulfate to maintain its continuous operation,
   c. transferring regenerated mixture from the regenerating scrubbers to the flue gas scrubber for subsequent scrubbing steps a),
   d. alternating steps a) and b) repeatedly in a continuous and regenerative cycling process, while allowing the sulfuric acid content of the mixture to increase until the time when the mixture is removed from cycling and replaced by a new mixture conforming to that provided in step a), and,
   e. passing said gas after being subjected to the iron sulfate mixture through an aqueous solution of a nitrogen compound selected from the group consisting of urea and guanidine to remove any acid mist from said gas.

* * * * *